United States Patent [19]

Power et al.

[11] Patent Number: 5,790,422

[45] Date of Patent: *Aug. 4, 1998

[54] METHOD AND APPARATUS FOR DETERMINING THE QUANTITY OF A LIQUID IN A CONTAINER INDEPENDENT OF ITS SPATIAL ORIENTATION

[75] Inventors: Wendy Power, Westford; Michael A. Reed, Chelmsford, both of Mass.; Dominick J. Frustaci, Williamsville, N.Y.

[73] Assignee: Figgie International Inc., Willoughby, Ohio

[*] Notice: The term of this patent shall not extend beyond the expiration date of Pat. No. 5,726,908.

[21] Appl. No.: 406,695

[22] Filed: Mar. 20, 1995

[51] Int. Cl.⁶ .................................................. G01F 23/26
[52] U.S. Cl. .......................... 364/509; 73/304 C; 361/284
[58] Field of Search ........................... 73/304 C, 290 R, 73/149, 1 D, 1 H, 510, 500, 514.05, 1.73, 1.75; 33/366, 365, 377; 367/908; 340/612, 618, 620, 689, 686; 361/276, 284; 324/663, 664, 686, 689; 364/509, 566, 559; 116/109; 200/61.45 R, 61.52

[56] References Cited

U.S. PATENT DOCUMENTS

| | | | |
|---|---|---|---|
| 3,943,767 | 3/1976 | Efferson | 73/295 |
| 4,020,690 | 5/1977 | Samuels et al. | 73/299 |
| 4,194,395 | 3/1980 | Wood | 73/304 C |
| 4,417,473 | 11/1983 | Tward et al. | 73/304 C |
| 4,428,232 | 1/1984 | Tanaka et al. | 73/304 |
| 4,589,077 | 5/1986 | Pope | 364/509 |
| 4,844,117 | 7/1989 | Sung | 137/386 |
| 4,873,832 | 10/1989 | Porter | 62/49 |
| 4,912,662 | 3/1990 | Butler et al. | 364/559 |
| 5,018,387 | 5/1991 | Myneni | 73/295 |
| 5,095,747 | 3/1992 | Smith | 73/290 |
| 5,103,368 | 4/1992 | Hart | 361/284 |
| 5,138,880 | 8/1992 | Lee et al. | 73/304 C |
| 5,144,907 | 9/1992 | Erwin et al. | 505/1 |
| 5,167,154 | 12/1992 | Lee | 73/295 |
| 5,230,439 | 7/1993 | Klok et al. | 220/420 |
| 5,275,007 | 1/1994 | Nesser | 62/49.2 |
| 5,357,758 | 10/1994 | Andonian | 62/45.1 |
| 5,423,214 | 6/1995 | Lee | 73/304 C |

OTHER PUBLICATIONS

Cryogenics, vol. 30, No. 6, Jun. 1990, Gullford GB, pp. 538–544, X PODO127927 I.V. Volichkov et al. "Capacitive Level Motors for Cryngenic Liquids with Consumous Round-Out".

Cryogenics, vol. 24, No. 2, Feb. 1984, Guildford GB, pp. 63–66 XP002006088 K. J. Kugler et al. "Non-power Dissipating Continuous Level Monitors For Liquid Nitrogen and Helium".

"Capacitive Sensing of Gaseous Fraction in Two-Phase Flow," *NASA Tech Briefs*, Jan., 1995.

*Primary Examiner*—Emanuel T. Voeltz
*Assistant Examiner*—Tony M. Cole
*Attorney, Agent, or Firm*—Hodgson, Russ, Andrews, Woods & Goodyear LLP

[57] ABSTRACT

A sensor apparatus is described that detects and indicates the quantity of cryogenic liquid in a Dewar container independent of the spatial orientation and physical motions acting on the Dewar container. The sensor apparatus comprises a first conductor, preferably positioned adjacent to the container inner shell wall and a second conductor comprising a plurality of axially spaced and concentric conductor bands mounted inside the container in a proximately spaced and a parallel relationship with respect to the first conductor. The second conductor bands divide the first conductor into zones that provide a plurality of distinct and separate capacitors. A computer measures the capacitance of each capacitor and compares the individual capacitance measurements to reference capacitance values corresponding to a known quantity of cryogenic fluid filled in the container at known angles of inclination. The sensor apparatus is also useful as a motion detector.

34 Claims, 5 Drawing Sheets

METHOD AND APPARATUS FOR DETERMINING THE QUANTITY OF A LIQUID IN A CONTAINER INDEPENDENT OF ITS SPATIAL ORIENTATION

BACKGROUND OF THE INVENTION

1. Field of the Invention

The present invention relates generally to a method and apparatus for detecting the quantity of liquid in a container such as a cryogenic liquid Dewar container independent of the spatial orientation and physical motions acting on the container and/or for indicating the absence of motion imparted to the container.

The capacitance between two conducting members is proportional to the amount of opposite and therefore mutually attractive electrical charges that can be gathered on the conductors in the presence of an electrical potential differential. The resulting electric field that is set up between the conductors holds the opposite charges captive. The electrical storage capacity of an electrical capacitor can be changed by placing a foreign material between the conductors. Materials which have this property of changing the effective field strength and therefore the amount of electrical charge that is held on proximately spaced conductors are known as dielectrics. The ability of a particular dielectric medium to cause an increase in the charge holding capacity of conductors in response to a similar applied electric potential differential placed on a capacitor is characteristic of the medium's dielectric coefficient, i.e., the ratio of the charge holding capacity or capacitance when the conducting members are separated by the foreign material or dielectric medium and when the conductors are separated by vacuum. In the present invention, dielectric coefficients can range from about one for ambient air to as high as 80 for distilled water.

2. Prior Art

The measurement of capacitance between two proximately spaced conductors having a known dielectric medium therebetween is a well known technique that is extensively used in the gauging of a liquid level. U.S. Pat. No. 4,589,077 to Pope describes a liquid level measuring apparatus for a tank comprising an elongated multi-stage capacitance probe that includes a column of capacitors extending in a known direction through the liquid interface. By identifying the capacitor in the column at the liquid level and the capacitor directly below the liquid level, the height of the liquid level within the tank is computed. If the volume of the tank is known, as a function of height, the volume of liquid remaining in the tank can also be computed. This measuring apparatus requires that the tank be motionless and of a known relative orientation.

U.S. Pat. No. 4,428,232 to Tanaka et al. describes a capacitance liquid level detector comprising a pair of helically coiled electrodes extending vertically in a container and at least partially submerged in a liquid stored therein. The upper and lower ends of the coils are connected to the respective ends of the container. An oscillator circuit of the resistance capacity type having a variable condenser consisting of the electrodes is arranged to oscillate at a frequency that is dependent upon the variation of the electrostatic capacitance between the electrodes so as to indicate the level of the stored liquid. This detector apparatus requires that the storage container be motionless and of a known relative orientation.

Another type of cryogenic liquid level detector apparatus is set forth in U.S. Pat. No. 3,943,767 to Efferson. This patent describes a detector apparatus system that comprises a filament of superconducting material vertically positioned inside the Dewar. A current is passed through the filament and as the gas-liquid interface moves along the filament, the voltage generated is a measure of the level of the gas-liquid interface. This measuring apparatus also requires that the tank remain motionless during the measurement and have a known relative orientation. Finally, U.S. Pat. No. 5,230,439 to Klok et al. describes a level detector comprising two elongated and parallel electrodes disposed inside a container. The electrodes are energized to provide a liquid level signal. This detector is not particularly useful for a container in motion and there is no means for indicating the inclination of the container.

A series of electrodes wrapped in a spiral pattern around a pipe along a portion of the length thereof has been suggested for the purpose of capacitive sensing of gaseous fraction in two-phase flow of a fluid through the pipe. See "Capacitive Sensing of Gaseous Fraction in Two-Phase Flow," *NASA Tech Briefs*, January, 1995.

As previously mentioned, the sensor apparatus of the present invention is also useful for indicating the absence of motion imparted to the container by indicating the change in inclination, or lack thereof, between two measurement events. An exemplary inclinometer according to the prior art is shown in U.S. Pat. No. 4,912,662 to Butler et al. Various commercially available devices have been provided for the purpose of functioning to signal "man-down".

SUMMARY OF THE INVENTION

The present invention provides a sensor apparatus comprising detector means for detecting, measuring and outputting the quantity of liquid contents in a container, preferably a cryogenic liquid Dewar container, independent of the spatial orientation and physical motions acting on the Dewar container. Also, by appropriate manipulation of the various measurements used to determine the liquid quantity independent of spatial orientation, the absence of motion imparted to the container is determined.

The present detector means comprise capacitor means having a first conductor means, preferably comprising the inner container wall, or a conductive member positioned adjacent to the container inner shell wall and a second conductor means preferably comprising a plurality of axially spaced and concentric conductor bands mounted inside the container in a proximately spaced and parallel relationship with respect to the first conductor means. Each conductor band serves as a separate and distinct capacitor formed by that portion of the proximately spaced first conductor means disposed adjacent to the individual conductor band. A computer calculates the capacitance value of each capacitor formed by the individual conductor bands and the adjacent portion of the first conductor means, independent of the other bands, and compares these capacitance measurements to a set of reference capacitance values corresponding to a known volume of cryogenic liquid in the container at a known inclination.

In the case of a Dewar container having a quantity of liquefied-gas as the cryogenic liquid, such as liquid air made up of a ratio of liquid oxygen and liquid nitrogen, the capacitance value is influenced by the amount of liquid phase air that is present in the space provided between the first and second conductor means. The dielectric coefficient for the liquid phase of oxygen and nitrogen is approximately 1.5 times greater than the value for the gas phase for each molecular constituent. This property causes the capacitance value to change by the same ratio when the space between the conductors comprising the capacitor means is partially filled with the cryogenic liquid in comparison to a base level or reference capacitance taken when the entire volume is filled with air as a gas. The reference capacitance can relate to any known value with which other capacitance measurements can be compared. The magnitude of the capacitance value differential is directly related to the quantity of the liquid between the conductors comprising the capacitor means, and therefore provides an indication of the quantity of liquid in the container.

The differential capacitance values are also useful for indicating the extent of physical activity of the user of the container. Regardless of whether the user is active or incapacitated, the respective capacitance measurements taken at spaced intervals of time will each indicate a capacitance. When the plurality of sequential capacitance measurements fall outside of a narrow deviation band or "window," it is interpreted that the user is active and therefore does not require assistance. However, when the capacitance measurements settle into the narrow deviation window and remain there for a predetermined period of time, a man-down event is triggered to indicate that the user of the container is not active, and may in fact be in peril.

The foregoing and additional advantages are characterizing features of the present invention that will become clearly apparent upon a reading of the ensuing detailed description together with the included drawings wherein:

DETAILED DESCRIPTION OF THE INVENTION

Turning now to the drawings, FIGS. 1 to 6 show a sensor means according to the present invention that is disposed inside a Dewar container 10 to detect and indicate the quantity of cryogenic fluid remaining in the Dewar. It should be understood that container 10 is merely exemplary and represents one embodiment of a container that is useful with the sensor means of the present invention. In that respect, the present sensor means is useful with many types of containers whose shape and construction are only limited by the imagination of those skilled in the art. For example, while container 10 is shown having a generally cylindrical shape closed at both ends, the present sensor means can be adapted for use with containers having a myriad of shapes other than cylindrical and the container need not be closed.

The sensor means will be described in detail hereinafter, but first the structure of container 10 is described.

Figures 1, 5:
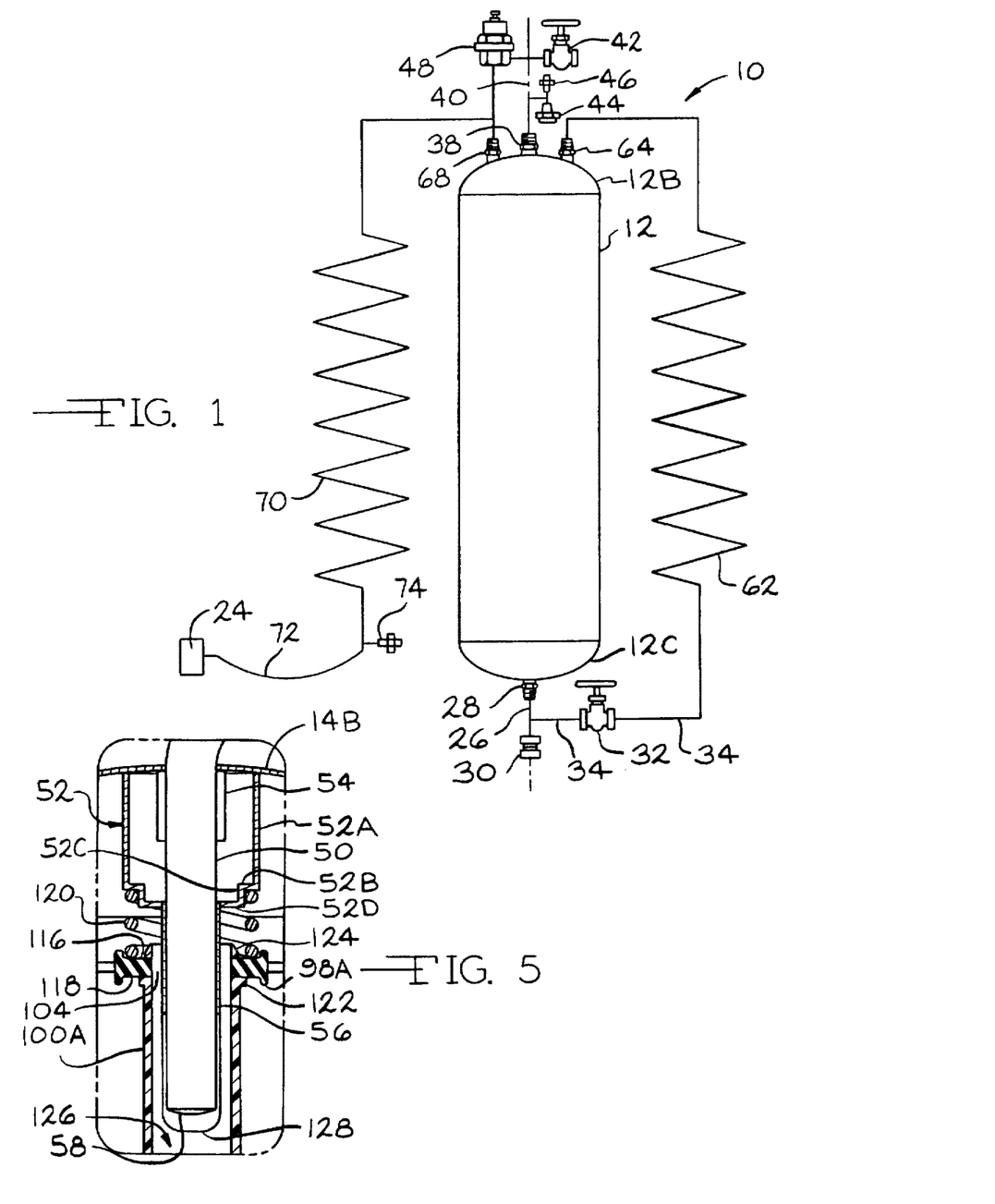
FIG. 1 is a perspective view, partly in schematic, of a cryogenic liquid Dewar container 10 for use with a liquid quantity sensor of the present invention.
FIG. 5 is an enlarged detailed view of a portion of the cryogenic liquid Dewar container 10 shown in FIG. 2.

Container 10 is shown in FIG. 1 partly in perspective view, partly in schematic and comprises an outer container means or outer shell 12 mounted around and surrounding an inner container means or inner shell 14 (FIG. 2) provided with a cryogenic liquid 16 such as a quantity of liquefied-gas. As shown in cross-section in FIG. 2, the outer shell 12 includes a generally cylindrical side wall 12A extending along and around the longitudinal axis of the container 10 with first and second dome portions 12B and 12C closing the opposed ends thereof. Similarly, the inner shell 14 has a cylindrical sidewall 14A extending along and around the longitudinal axis with first and second dome portions 14B and 14C closing the opposed ends thereof.

Figure 2:
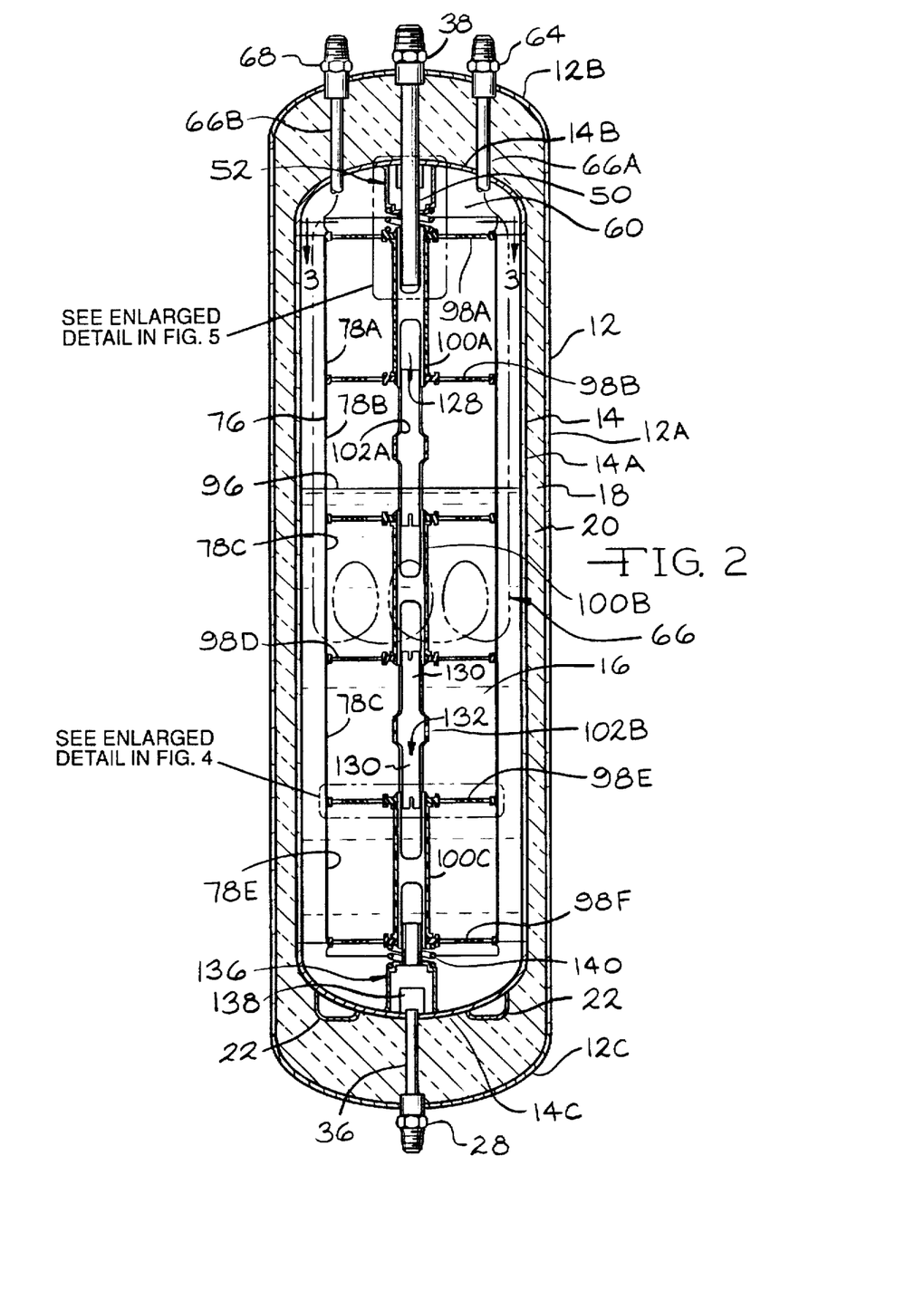
FIG. 2 is a partly schematic and partly cross-sectioned view showing the cryogenic liquid Dewar container 10 of the present invention shown in FIG. 1.

As further shown in FIG. 2, the space 18 formed between the inner and outer shells 12 and 14 is evacuated to a prescribed level relative to ambient pressure and provided with an insulation material 20 that helps thermally insulate the cryogenic liquid 16. A getter material 22 is mounted on the outside of the second dome 14C to absorb any residual gas molecules in the evacuated space 18 between the shells 12 and 14. Often the cryogenic liquid 16 is a liquefied air mixture having an enriched oxygen concentration that serves to supply breathable air to a pressure regulator and associated facepiece 24 (shown in block representation in FIG. 1), as is well known to those of ordinary skill in the art.

As shown schematically in FIG. 1, an input/output fluid conduit 26 extends from a threaded nipple 28, or a similar coupling means mounted on the second dome 12C of outer shell 12. Conduit 26 leads to a quick-disconnect coupling 30 that serves as a connection means for connecting the Dewar container 10 to a pressurized liquefied-gas supply (not shown) for filling the cryogenic liquid 16 into inner shell 14. A manual shut-off valve 32 is connected to the input/output conduit 26 between nipple 28 and coupling 30 via conduit 34. The pressure of the cryogenic liquid 16 inside the inner shell 14 is preferably held at a minimum of about 60 psi.

As shown in FIG. 2, nipple 28 leads inside the outer shell 12 to a conduit 36 extending through the evacuated space 18 to enter the inner shell 14 in communication with the contents contained therein. Similarly, the first dome 12B of the outer shell 12 is provided with an axially positioned threaded nipple 38, that serves to connect Dewar container 10 to exterior components located outside the enclosure of the outer shell 12. As particularly shown in FIG. 1, nipple 38 is connected by an outlet conduit 40 to a vent valve 42, burst disk 44, a pressure relief valve 46, and an economizer valve 48.

As shown in FIG. 2, nipple 38 leads inside the outer shell 12 to a relatively thin walled conduit 50 entering the inner shell 14 along the longitudinal axis thereof. A relatively thick walled stand-off 52 is mounted on the inside of the first dome 14B, coaxially around conduit 50. Stand-off 52 is shown in enlarged detail in FIG. 5 and comprises a first, large diameter cylindrical portion 52A extending to a first web portion 52B that forms into a second, lesser diameter ring portion 52C. Ring portion 52C in turn extends to a second web 52D that completes stand-off 52. A pair of diametrically opposed openings 54 (only one shown) having a generally square shape, are provided through cylinder portion 52A to provide for fluid flow into and out of the enclosure of the stand-off 52. An inner annular circumference of second web 52D connects to a relatively thin-walled, low thermal conductivity sleeve 56 (FIG. 5) fitted around the outside wall of a portion of conduit 50 in a closely spaced relationship therewith. Stand-off 52 thereby provides support for conduit 50 which in turn provides a low thermal conductivity passage from the evacuated space 18 into the inner shell 14.

Conduit 50 is provided with an open terminal end 58. This provides a sufficient vent space at the upper portion of the inner shell 14 above the opening 58 where a gas pocket 60 (FIG. 2) forms that prevents the inner shell 14 from being overfilled with cryogenic liquid 16. In that respect, when Dewar container 10 is being filled with cryogenic liquid 16 and with valve 42 (FIG. 1) turned to an open position, at such time as liquid 16 blows out through valve 42, the container 10 is filled to the prescribed level as defined by opening 58 in conduit 50. The terminal opening 58 of conduit 50 also provides for passage of conducting wires (not shown) connected to the sensor means of the present invention by hermetic connectors having compression glass seals (not shown), as is well known to those skilled in the art. The sensor means will be explained in detail presently.

As schematically shown in FIG. 1, one end of conduit 34 intersects input/output conduit 26 while the other end leads to a first endothermic heat exchanger 62 mounted outside Dewar container 10. Heat exchanger 62 serves to conduct heat energy from the ambient surroundings to the cryogenic liquid 16, which preferably is liquefied air, to vaporize the liquid to a gas and then to warm the gas. The warmed gas then leaves the first endothermic heat exchanger 62 and re-enters the first dome 12B of the outer shell 12 through threaded nipple 64 leading to an inlet conduit 66A of an internal exothermic heat exchanger 66 (FIG. 2) provided inside inner shell 14. Exothermic heat exchanger 66 is shown schematically in FIG. 2 and it serves to conduct a portion of the heat energy imparted to the warmed gas by the first endothermic heat exchanger 62 to the cryogenic liquid 16 remaining inside the inner shell 14.

The outlet conduit 66B of the exothermic heat exchanger 66 connects to a threaded nipple 68 mounted on the first dome 12B. Nipple 68 in turn leads to a second endothermic heat exchanger 70, shown schematically in FIG. 1, which is similar to the first endothermic heat exchanger 62. When the warmed gas leaving the first endothermic heat exchanger 62 moves through the exothermic heat exchanger 66, heat energy is conducted to the cryogenic liquid 16 inside the inner shell 14. The temperature of the gas in heat exchanger 66 is cooled an amount dependent on the flow rate, and the heat energy of the cryogenic liquid 16 inside inner shell 14 is raised a like amount. The cooled gas leaving the internal exothermic heat exchanger 66 then moves to the second endothermic heat exchanger 70, which serves to warm the gas to about ambient temperature. An outboard end of the second endothermic heat exchanger 70 preferably connects to a flexible tube 72 that supplies the warmed gas to the pressure regulator and an associated on-demand facepiece 24 (shown in block representation in FIG. 1), which is worn by a user breathing the air. A pressure relief valve 74 is provided adjacent to the outboard end of the second endothermic heat exchanger 70.

FIGS. 2 to 6 further show the sensor means of the present invention for detecting and indicating the quantity of cryogenic liquid 16 in the inner shell 14 of Dewar container 10, independent of the physical motions acting on the container, and independent of the spatial orientation of the container. It should be understood that the sensor means of the present invention is useful for detecting and indicating the liquid quantity in various types of containers and that the sensor means is shown associated with the previously described cryogenic Dewar container 10 by way of example, not limitation.

The liquid quantity sensor of the present invention will first be described in general terms and later in detail.

Figure 6:
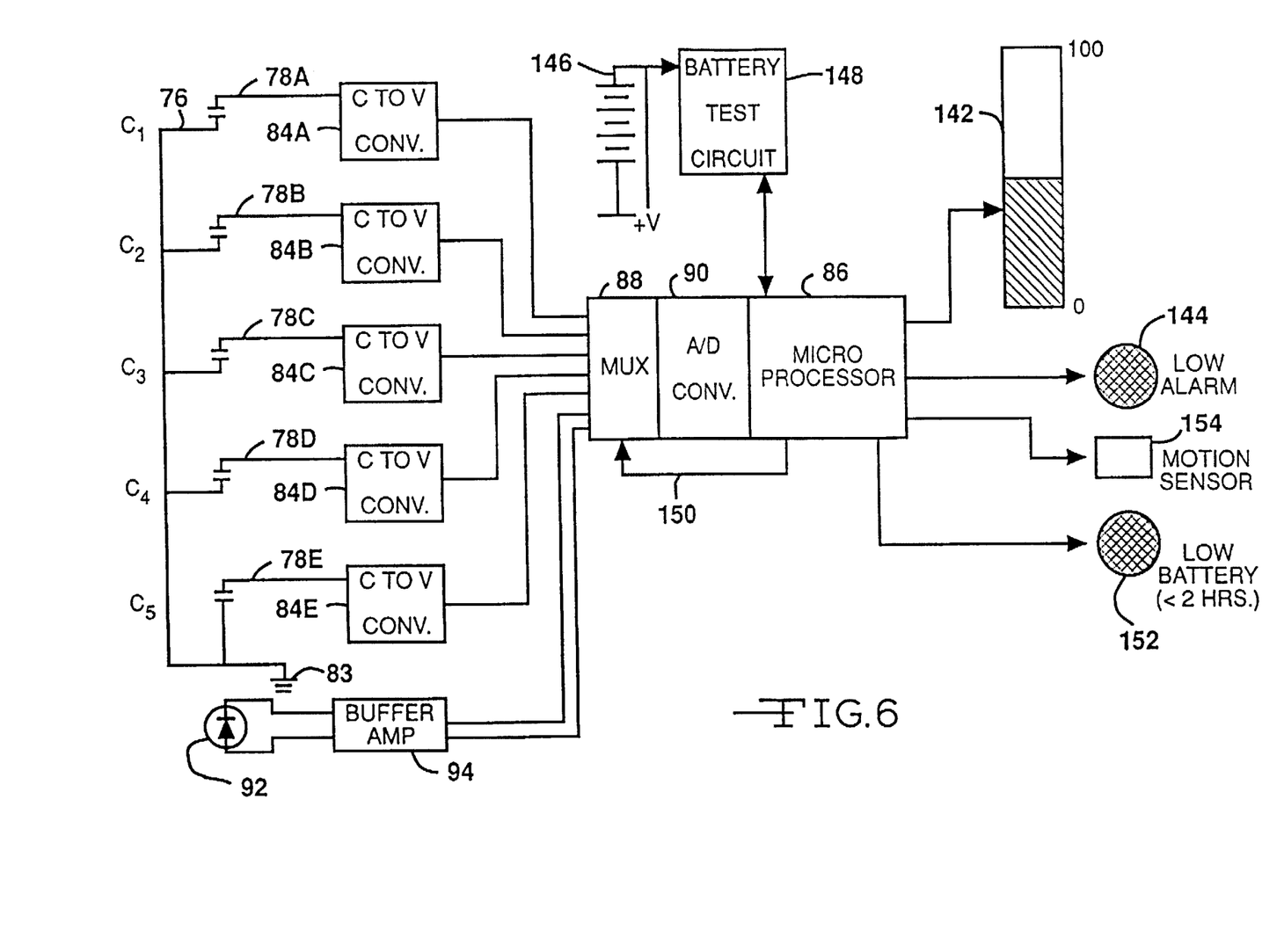
FIG. 6 is a block diagram of the cryogenic liquid quantity sensor of the present invention.

As shown diagrammatically in FIG. 6, the quantity of cryogenic liquid 16 is determined by a capacitance based sensing apparatus using a first, cylindrically shaped conductor 76 (FIGS. 2 to 4 and 6) extending along and around the longitudinal axis of container 10 from adjacent to dome 14B of inner shell 14 to a position adjacent to dome 14C, and a plurality of independent conductor bands, indicated as bands 78A to 78E, that together serve as a second conductor means. The conductor 76 and bands 78A to 78E are preferably made of a conductive mesh material that readily enables cryogenic fluid 16 to flow into and out of the space therebetween.

The conductor 76 and bands 78A to 78E can be discontinuous or they can be endless, the former being preferred. As shown in cross-section in FIG. 3, a clearance 80 is preferably provided between the proximate ends of conductor 76 and a clearance 82 is preferably provided between the proximate ends of exemplary band 78A. This prevents buckling and distortion in the conductor 76 and bands 78A to 78E due to temperature variations. What is important is that there is established a substantially uniform electric field generated between conductor 76 and bands 78A to 78E, as will be explained in detail hereinafter. It should also be understood that the clearances 80, 82 are preferably offset with respect to each other so that there is no overlap. This construction helps to minimize the effect the clearances may have on the capacitance measurements made of the generated electric field.

First conductor 76 is mounted inside the inner shell 14 in a coaxial relationship with respect to the longitudinal axis thereof and parallel with respect to the side wall 14A. Conductor 76 is connected to an electrical ground, schematically shown in FIG. 6 at 83, and each of the independent conductor bands 78A to 78E are provided in a proximately spaced and parallel relationship with respect to the first conductor 76 such that each band 78A to 78E "covers" a respective zonal area of the inner surface of first conductor 76 with the gap therebetween remaining relatively small and constant to comprise the capacitance means of the present invention. That way, independent of the spatial orientation of the Dewar container 10, the cryogenic liquid 16 immerses some portion of at least one or more of the independent conductor bands 78A to 78E to serve as a dielectric thereof and change the respective capacitance measurements $C_1$ to $C_5$ of that portion of each of the immersed bands with respect to predetermined baseline capacitance measurements. For example, in the case of the baseline capacitance being derived from an inner shell 14 filled with gas in comparison with the inner shell 14 partially filled with cryogenic liquid 16, the latter capacitance measurement increases due to the greater dielectric constant of the cryogenic liquid 16 versus gas. The magnitude of the capacitive increase is proportionate to the area of each of the various independent bands 78A to 78E immersed in the fluid 16.

As shown in block diagram in FIG. 6, the respective capacitance measurements $C_1$ to $C_5$ derived from each of the plurality of conductor bands 78A to 78E, which divide the area of first conductor 76 into capacitor zones, are fed to respective convertors 84A to 84E. Convertors 84A to 84E in turn respectively send an amplified proportionate voltage measurement to a micro-processor 86 via a multiplexer and an analogue-to-digital convertor, indicated as blocks 88 and 90 respectively. Micro-processor 86 serves as a computer means to process this data along with an input from a cryogenic liquid temperature sensor, indicated as component 92 in FIG. 6, to provide a calculated cryogenic liquid quantity. The temperature measurement is fed to a buffer unit, indicated as block 94 in FIG. 6, and then to computer 86 via multiplexer 88 and A/D convertor 90.

The temperature of the cryogenic liquid is used to correct the calculated liquid quantity and provide a corrected liquid quantity, indicated at 96 in FIG. 2. For example, when the cryogenic liquid 16 comprises a mixture of oxygen and nitrogen, ($O_2/N_2$), the dielectric constant of $O_2/N_2$ is a function of the temperature of the liquid and consequently, the capacitance measurements $C_1$ to $C_5$ will change with the liquid temperature for a fixed zonal coverage ratio. From this temperature measurement, and with the volumetric configuration of Dewar container 10 known, the quantity of cryogenic liquid 16 in the Dewar container 10 can be accurately determined. Also, since the quantity of cryogenic liquid 16 is determinable at any one time by manipulation of the independent capacitance measurements $C_1$ to $C_5$, as described above, the change in cryogenic quantity or a differential quantity measurement is determined by measuring the relative change in the capacitance measurements $C_1$, to $C_5$ from a first reading to a second reading.

As will be explained in detail hereinafter, a database stored in the computer 86 is provided with data tables having reference capacitance values for various percent fill quantities of the cryogenic liquid 16 at various inclinations. Since the area of cryogenic liquid 16 in contact with each of the conductor bands 78A to 78E can be measured independently, the inclination of the Dewar container 10 can be determined without the need of an associated inclinator. Change in inclination is calculated by measuring the relative change in capacitance of each band 78A to 78E from a first capacitance reading taken at a first inclination to a second capacitance reading taken at a second inclination. The calculation of the cryogenic liquid 16 quantity derived from the contact area of the cryogenic liquid 16 and the capacitance means, and the calculation of the inclination of the Dewar container 10 will now be explained in greater detail.

As shown in cross-sectional detail in FIGS. 2 to 5, the zonal capacitance measurement system of the present invention is derived from the plurality of conductor bands 78A to 78E aligned in series inside inner shell 14 with each band being in a proximately spaced and parallel relationship with respect to the cylindrically shaped first conductor 76. Conductor 76 is maintained in its parallel relationship with respect to the side wall 14A of the inner shell 14 by a network of insulators 98A to 98F locked to alternating female spacers 100A to 100C and spacers 102A and 102B separated by alternating and interconnecting male spacers 102A and 102B. Insulators 98A to 98F, spacers 100A to 100C and spacers 102A and 102B are made of a non-conductive material having a similar coefficient of thermal expansion as conductors 76 and 78A to 78E. This ensures that the gap between conductor 76 and conductors 78A to 78F is maintained at a constant distance of about 0.020 inches at the approximate −280° F. operating temperature for Dewar container 10. Additionally, constructing these components of a non-conductive material eliminates any undue stress forces on the components, i.e., 76, 78A, 98A to 98F, 100A to 100C, and 102A and 102B which are assembled into the inner shell 14 at about 70° F., when they are contacted by the cryogenic liquid 16. The preferred material for insulators 98A to 98F and spacers 100A to 100C and 102A and 102B is TORLON® thermoplastic polymer, which has a similar coefficient of thermal expansion as type 316 stainless steel used for conductors 76 and 78A to 78E.

Figure 3:
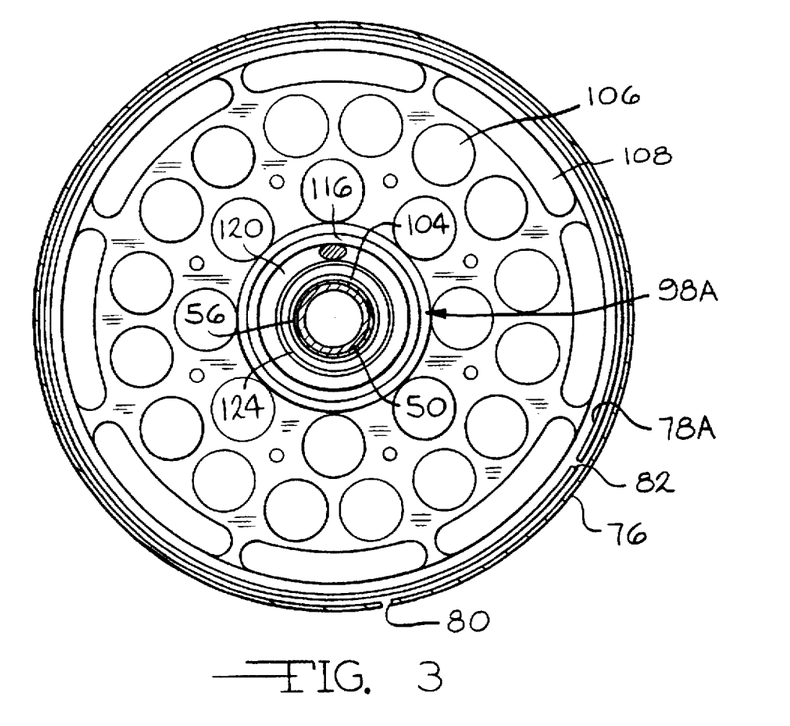
FIG. 3 is a cross-sectioned view along line 3—3 of FIG. 2.

Insulator 98A, shown in plan view in FIG. 3, is representative of the other insulators 98B to 98F and it has a circular shape provided with a central circular opening 104 and a pattern of secondary openings having circular shapes 106 and somewhat elongate banana shapes 108. The openings 106 and 108 allow for cryogenic liquid 16 flow from one side of the various insulators to the other side.

Figure 4:
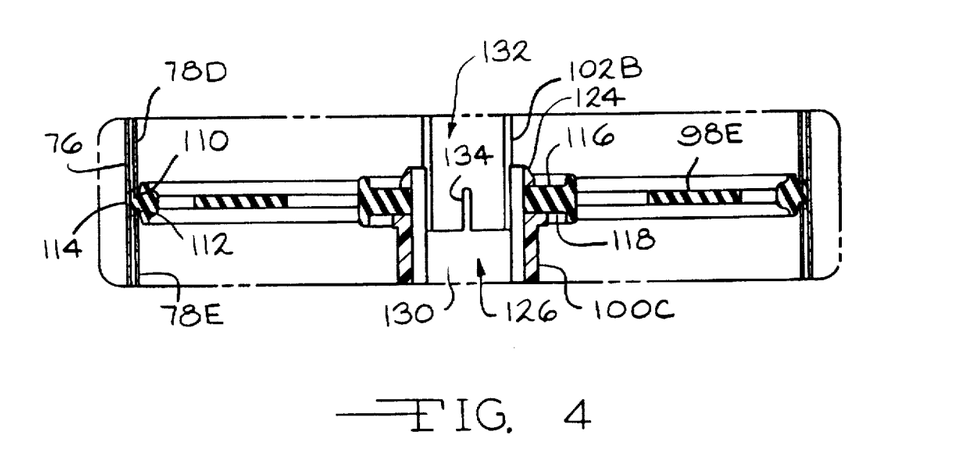
FIG. 4 is an enlarged detailed view of a portion of the cryogenic liquid Dewar container 10 shown in FIG. 2.

FIG. 4 shows an enlarged cross-section of a representative insulator 98E having an outer circumference provided with opposed annular channels 110 and 112 and an intermediate annular protrusion 114. A cylindrical outer face of protrusion 114 contacts conductor 76 while the inner portion of insulator channel 110 provides a seat that receives one of the annular edges of conductor band 78D and insulator channel 112 provides a seat that receives an adjacent one of the annular edges of conductor band 78E.

As further shown in FIGS. 2 and 5, the inner annular circumferential portion of insulator 98A surrounding central circular opening 104 has a T-shaped cross-section aligned normal to the axis of container 10 to provide opposed inner ledges 116 and 118. Ledge 116 receives one end of a coil spring 120 seated therein and biasing between insulator 98A and the annular ledge formed by the outer junction between web portion 52B and ring portion 52C of stand-off 52.

The opposite ledge 118 of insulator 98A serves as a seat for an annular rim 122 formed at the first end of female spacer 100A received in central opening 104 of insulator 98A. The first end of spacer 100A further includes an annular extending tab 124 that hooks over and around the first ledge 116 of insulator 98A adjacent to coil spring 120. That way, annular rim 122 in conjunction with tab 124 contacting the opposed ledges 116 and 118 lock insulator 98A to spacer 100A. While it is not shown in enlarged detail in FIG. 2, the opposed end of spacer 100A is received in a central opening in second insulator 98B and has a similar rim and tab structure that together lock spacer 100A to insulator 98B in a similar manner as spacer 100A is locked to insulator 98A. From FIG. 2, it can further be seen that the opposed ends of the second female spacer 100B similarly lock to insulators 100C and 100D, and that the opposed ends of the third female spacer 100C similarly lock to insulators 98E (FIG. 4) and 98F.

First spacer 100A is further provided with a central passage 126 (FIG. 2 and 5) extending along and around the longitudinal axis of container 10 between opposed open ends provided adjacent to and between the first and second insulators 98A and 98B. Two pairs of opposed U-shaped openings 128 extend from each open end thereof towards the middle portion of spacer 100A. Openings 128 communicate with passage 126 centrally located through spacer 100A to provide for flow of cryogenic liquid 16 into and through spacer 100A. As further shown in FIG. 5, a portion of the low thermal conductivity sleeve 56 fitted around the outside wall of a portion of conduit 50 is itself fitted inside the inner wall of spacer 100A such that conduit 50 is positioned inside passage 126 and in coaxial alignment therewith. That way, cryogenic liquid 16 contained inside inner shell 14 is able to flow through the U-shaped openings 128 in spacer 100A in communication with passage 126 and into opening 58 in conduit 50 during filling of Dewar container 10 with cryogenic liquid 16, as previously discussed.

Second insulator 98B is further provided with an outer annular circumference having opposed annular channels 110, 112 similar to channels 110 and 112 of first insulator 98A. The opposed annular channels 110, 112 of insulator 98B receive the adjacent annular edges of first and second conductor bands 78A and 78B, respectively. Thus, first conductor band 78A is held in its proximately spaced and parallel relationship with respect to conductor 76 seated in the annular channels 112 and 110 of respective first and second insulators 98A and 98B while insulators 98A and 98B are in turn secured in place by their locking engagement with the opposed ends of spacer 100A.

Male spacer 102A is shown in FIG. 2 having its opposed ends fitted inside female spacers 100A and 100B and male spacer 102B has its opposed ends fitted inside female spacers 100B and 100C. A portion of representative male spacer 102B is shown in enlarged detail in FIG. 4. Male spacer 102B has a generally cylindrical shape provided with two pairs of opposed U-shaped openings 130 that extend from each open end thereof towards the middle portion of spacer 102B and which are in fluid flow communication with a central passage 132 therethrough. A plurality of axial slots 132 are provided at each end of the male spacers 102A and 102B (only one slot 134 is shown in male spacer 102B in FIG. 4). Slots 134 enable the spacers 102A and 102B to flex adjacent to the slots 134 to thereby provide a snug fit when male spacers 102A and 102B are mated to their respective female spacers 100A to 100C. The central longitudinal passages 126 of the female spacers 100A to 100C are thereby in continuous communication with the central passages 132 of the male spacers 102A and 102B to provide for continuous and uninterrupted fluid flow through the network of male and female spacers. The U-shaped openings 128 in the female spacers and the U-shaped openings 130 in the male spacers thereby provide for fluid flow into and out of the central passages to communicate with the inner enclosure of the inner shell 14. Finally, the openings 106 and 108 in the spaces 102A to 102F provide for fluid flow from one side of the spacer to the other.

A second stand-off 136 is mounted on the inside of dome 14C of the inner shell 14, coaxially around the longitudinal axis of container 10. Stand-off 136 is provided with a pair of diametrically opposed openings 138 (only one shown) having a generally square shape that provide for fluid flow into and out of the enclosure of the stand-off. Stand-off 136 further supports one end of a coil spring 140 which biases between insulator 140F and second stand-off 136 in a similar manner as spring 120 biases between stand-off 52 and insulator 98A. Biasing springs 120 and 140 in conjunction with stand-offs 52 and 136 thus help to support the plurality of conductor bands 78A to 78E comprising the second conductor means in coaxial alignment with large cylindrical conductor 76 independent of the spatial orientation of container 10. Springs 120 and 140 also serve as dampers to absorb axial shock forces that may be imparted to container 10 and to maintain the conductors 76 and 78A to 78E in axial alignment with respect to each other and with respect to the side wall 14A during a disturbance caused by shock forces.

Thus, it is apparent from FIGS. 2 to 5, that the liquid quantity sensor of the present invention comprises separate and distinct conductor bands 78A to 78E locked in their parallel and coaxial alignment with respect to each other by the interconnecting network of spacers 100A to 100C and 102A and 102B, and associated insulators 98A to 98F and locked in their proximately spaced and parallel relationships with respect to conductor 106 by opposite facing annular channels 110 and 112 of two consecutive insulators supported by the interconnected male and female spacers. Conductor 76 is in turn held in position by the respective protrusions 114 extending radially outwardly at intermediate positions between the opposed outer steps of the spacers. This entire construction is then locked in the position shown in FIG. 2 by the bias applied to stand-offs 52 and 136 and associated insulators 98A and 98F by springs 54 and 140 to thereby provide a capacitor means that is useful for detecting the quantity of the cryogenic fluid 16 inside inner shell 14.

In Use

Dewar container 10 is intended for use by people needing to breath in a hostile environment where the atmosphere is not conducive to supporting life. In that respect, a user will first don the facepiece 24 (shown in block representation in FIG. 1) while the container 10 is carried on the back by a harness, as is well known to those of ordinary skill in the art. Inner shell 14 has previously been filled with cryogenic liquid 16. Valve 32 is then turned to an open position permitting flow through the system. The cryogenic liquid 16 flows from the inner shell 14 via conduits 26 and 34 to the first endothermic heat exchanger 62 which adds heat energy to the cryogenic liquid 16 to provide for initial vaporizing and then warming of the liquid 16. The raised-energy fluid leaving the first endothermic heat exchanger 66 is then in a gaseous state near ambient temperature, the actual gas temperature dependent on the flow rate through the heat exchanger 62. This gas then moves through the internal exothermic heat exchanger 66 mounted inside the inner shell 14 where thermal energy input into the raised-energy fluid is conducted to the cryogenic liquid 16 still inside the inner shell 14. This adds heat energy to the cryogenic liquid 16, and causes some of the cryogenic liquid to boil and thereby maintain a pressure head inside the inner shell 14 while simultaneously causing the temperature of the gas flowing through the exothermic heat exchanger 66 to cool. The cooled gas in the exothermic heat exchanger 66 is then moved to the second endothermic heat exchanger 70 where heat energy is again conducted from the ambient surroundings to warm the gas to about ambient temperature before the gas is delivered to the facepiece 22 as a breathable air mixture.

Preferably, heat exchanger 66 is disposed inside the inner shell 14 such that some portion of heat exchanger 66 is at least partially immersed in the cryogenic liquid 16 independent of the spatial orientation of the container 10 to provide a breathing apparatus that is operable in any spatial orientation. For a more detailed description of the spatial independent vaporization function of Dewar container 10, reference is made to U.S. Pat. No. 5,357,758 to Andonian, the disclosure of which is incorporated herein by references.

The liquid quantity sensor of the present invention is provided inside the inner shell 14 to continuously monitor the liquid quantity of cryogenic liquid 16 remaining inside the Dewar container 10. This is derived by using a mathematical model of the geometry of the sensor configuration as previously described, i.e., the configuration of conductor 76 and conductor bands 78A to 78E in relation to the shape and volume of inner shell 14. From the capacitance measurements $C_1$ to $C_5$ of each "zone" of conductor 76 covered by bands 78A to 78E, the fractional coverage of each zone can be predicted for any quantity of liquid 16 and at any orientation angle of Dewar container 10. The computer 86 does this by scaling the raw capacitance measurement $C_1$ to $C_5$ for each zone to create an uncovered value as zero and a fully covered value as one. Computer 86 takes this data, computes an average percentage fill of Dewar container 10 and then selects the nearest percent from a fill table stored in a database input in the computer memory for a wide range of fill quantities and inclination angles to thereby produce a best fit for one fill value at a specific angle of inclination. This process is periodically repeated to thereby determine a change in liquid quantity from a first measurement event to a second measurement event and to determine a change in inclination of the Dewar container 10 with respect to the two measurement events.

As further shown in the block diagram in FIG. 6, the micro-processor 86 sends the calculated cryogenic fluid level reading to a monitor (not shown) that is provided with a display such as, for example, the bar graph 142 for visually outputting the quantity of cryogenic liquid 16 remaining in Dewar container 10. It should be understood that the output of display 142 can be in many forms such as LED's or numeric read-out, and that the bar graph shown is only representative. The Dewar container 10 monitor is also provided with an alarm 144 that emits a detectable signal such as a pneumatic tactical or an audible form, at such time as the supply of cryogenic liquid 16 has been depleted to about 25 percent of total capacity. Electrical power is provided to the sensor means by a battery 146 connected to a battery test circuit, indicated as block 148 tied in with computer 86 which regulates the distribution of power to the sensor means via a power transmission cable 150 tied to multiplexer 88, A/D converter 90 and in turn micro-processor 86. A battery low power alarm 152 is provided to signal when the energy left in battery 146 is depleted to a predetermined level. The predetermined level would be established to ensure a residual battery energy capacity to allow sufficient time for egress of the respirator user from a hazardous environment. The trigger level therefore would be set at a battery energy capacity equivalent to one or more hours of continuous operation (in alarm mode).

An associated motion sensor mechanism, indicated as block 154, can be provided that senses a lack of motion of the Dewar container 10 to trigger the alarm 144. In this case, the alarm 144 will emit a detectable signal, preferably different than that which is emitted to indicate a low cryogenic liquid situation, to provide a personal alarm system (PAS). For example, if a user of the present apparatus has been incapacitated due to injury and the like and has not moved for some period of time, for example twenty seconds, motion sensor 154 triggers alarm 144 to send out a man-down alarm signal.

Further, it will be readily apparent to those skilled in the art that the present sensor apparatus is itself useful for sensing lack of motion. In that respect, the sensor apparatus of the present invention need not necessarily be associated with a breathing apparatus. Instead, it can be miniaturized and provided as a device intended to be worn or carried on the user's belt and the like with a liquid permanently contained therein. When the present sensor apparatus is used as such a motion sensor mechanism indicative of "man down," comparison of the various capacitor measurements with a reference set of values is not required since it is the comparisons of a plurality of sets of measured percentage of contact values at a plurality of finite intervals of time respectively over a predetermined period of time that will indicate lack of motion since there would be no loss of liquid from the container.

Figure 7:
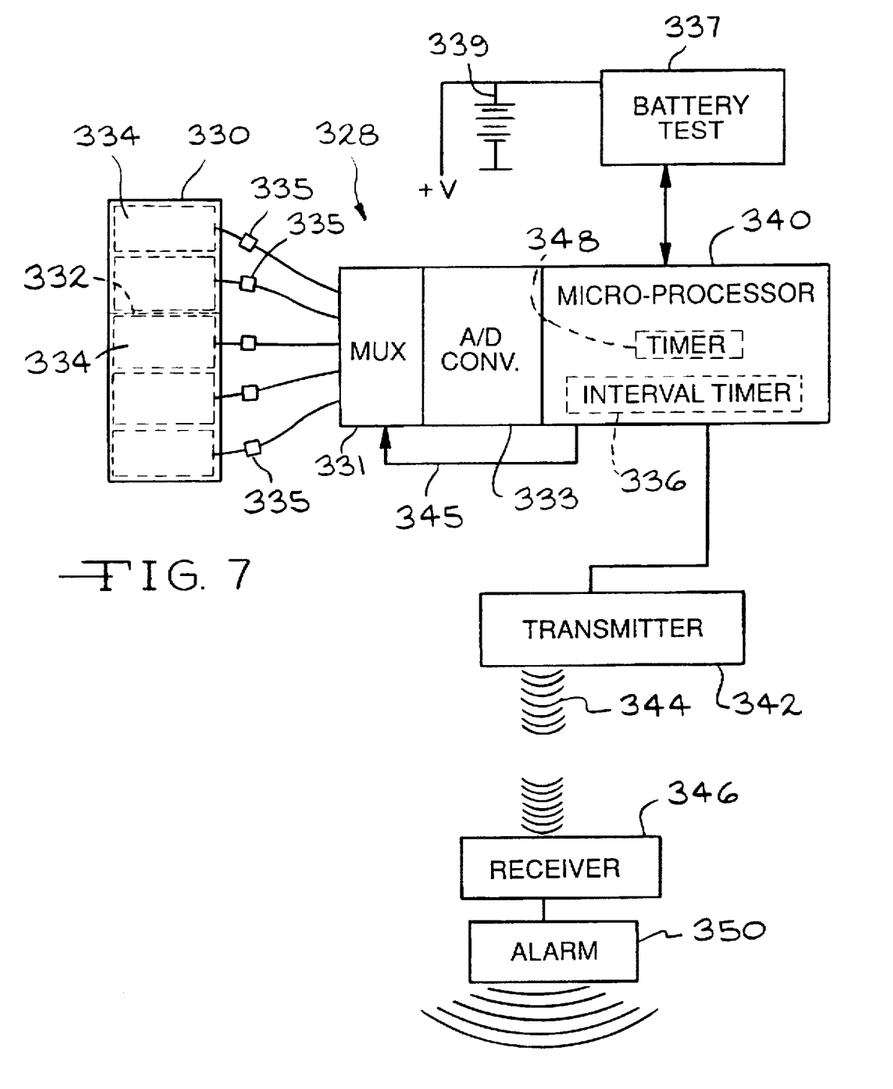
FIG. 7 is a block diagram of a motion sensor in accordance with another embodiment of the present invention.

Referring to FIG. 7, a motion sensor mechanism 328 includes a container 330 at least partially filled with liquid 332 and sized perhaps to be miniaturized and worn on the user's belt, for example, and having perhaps five zonal conductor bands 334. Since the liquid 332 is not used for breathing, it need not be cryogenic and may be any suitable liquid and may be disposed generally permanently in the container 330 so as not to be released during normal use or during man-down. The container 330 may, for example, be elongate and cylindrical and divided axially into the zones. Container 330 and bands 334 may be similar to container 10 and bands 78A to 78E.

The measured and suitably processed percentage of contact values from bands 334 are routed via capacitance to voltage converts 335 respectively to a micro-processor 340 which receives the signals via a multiplexer and an analogue-to-digital converter, indicated at 331 and 333 respectively, and which is suitably programmed, in accordance with principles commonly known to those of ordinary skill in the art to which this invention pertains, to compare the percentages of contact values at different times respectively.

Similarly as illustrated in FIG. 6, electrical power is provided by a battery 339 connected to a battery test circuit, indicated at 337, tied in with micro-processor 340, which regulates the distribution of power via a power transmission cable 345 tied to multiplexer 331, A/D converter 333, and in turn micro-processor 340.

Micro-processor 340 is suitably programmed, in accordance with principles commonly known to those of ordinary skill in the art to which this invention pertains, to provide a timer means 348 for triggering the obtaining of a percentage of contact value at each of specified time intervals, the micro-processor being programmed to compare the percentage of contact values thus obtained over the predetermined period of time and is further programmed to cause a transmitter 342 to transmit a signal, indicated at 344, to a receiver 346 for signalling an alarm device 350 to, for example, sound if the sets of percentage of contact values are substantially the same, i.e., if they fall within a certain predetermined range or window. The micro-processor 340 is further programmed to provide and a resettable software timer means 336 which resets the micro-processor 340 after a predetermined period of time of perhaps twenty seconds to start a new comparison. By "a plurality of intervals of time", as used herein and in the claims, is meant to include a continuous obtaining and comparing of the measured percentage of contact values over the predetermined period of time. Thus, the motion sensor 328 may comprise the interval timer means or other suitable means which allows either periodic or continuous comparison of the measured percentage of contact values. The motion sensor 328 may be provided using discreet circuit components instead of the microprocessor using principles commonly known to those of ordinary skill in the art to which this invention pertains.

For a more detailed discussion of the processing of the capacitance measurements for indicating the quantity of fluid in the container and for use as a motion sensor, reference is made to the simultaneously filed patent application Ser. No. 08/406,508 entitled "Method And Apparatus For Determining Quantity of Liquid In A Container And/Or Lack Of Motion Thereof," which is assigned to the assignee of the present invention and incorporated herein by reference.

It can thus be seen that the present invention provides a sensor apparatus for detecting the liquid in an associated container and for indicating the quantity of the liquid in the container, independent of the physical motions acting on the container, and independent of the spatial orientation of the container. The liquid sensing apparatus of the present invention is also useful for indicating the motion of the associated container as a PAS for determining whether or not a user of the apparatus is active or has somehow become "incapacitated" and in need of immediate assistance.

Also, for a detailed discussion of various other embodiments of sensor means that are useful for detecting the quantity of liquid in a container such as a cryogenic liquid Dewar container, reference is made to the simultaneously filed patent application entitled "Cryogenic Liquid Quantity Sensor and Method," which is assigned to the assignee of the present inventions and incorporated herein by reference.

It is intended that the foregoing description only be illustrative of the present invention and that the present invention is limited only by the hereafter appended claims.

What is claimed is:

1. An apparatus for detecting at least one of liquid quantity within a container means and a spatial orientation of the container means, which comprises:
   a) capacitor means disposed inside the container means, wherein the container means comprises a closed curved side wall enclosing a volume and wherein the capacitor means is comprised of a conductive portion of the closed curved side wall providing a first conductor and a plurality of second conductive band means electrically insulated from each other, wherein the second conductive band means are spaced from the first conductor to follow the contour of the conductive portion of the closed curved sidewall to thereby divide the container means into capacitor zones delineated by the plurality of the second conductive band means, wherein the capacitor means is contactable by a liquid contained inside the container means to thereby provide a plurality of capacitance measurements related to the extent the second conductive band means are immersed in the liquid in the container means, independent of the spatial orientation of the container means; and
   b) computer means for determining at least one of the quantity of liquid and the spatial orientation of the container means by appropriate manipulation of the capacitance measurements with respect to reference capacitance values for various percent fill quantities of the liquid in the container means at various spatial orientations.

2. The apparatus of claim 1 wherein the liquid comprises a cryogenic liquid.

3. The apparatus of claim 2 wherein the cryogenic liquid is comprised of a breathable mixture containing oxygen and nitrogen.

4. The apparatus of claim 1 wherein the reference capacitance values are derived from either the liquid in the container means or a reference fluid serving as a second dielectric for a known extent of the plurality of capacitor means.

5. The apparatus of claim 1 wherein an inner wall of the container means has a generally cylindrical shape closed by first and second closure means provided at opposed ends thereof and wherein the second conductive band means are disposed adjacent to the inner wall to immerse at least part of them in the liquid independent of the spatial orientation of the container means.

6. The apparatus of claim 1 wherein a thermometer means provides a measurement of the temperature of the liquid within the container means, and wherein the computer means serves to manipulate the comparison of the plurality of capacitance measurements to the reference capacitance values with respect to the temperature measurement to determine at least one of the quantity of liquid in the container means and the spatial orientation of the container means.

7. The apparatus of claim 1 wherein the plurality of capacitance measurements are manipulated by comparing them to the reference capacitance values to thereby obtain a best fit between the capacitance measurements and the reference capacitance values at various percent fill quantities and at the various spatial orientations.

8. The apparatus of claim 1 including an alarm means that is actuatable by the computer means when the plurality of capacitance measurements fail to deviate by a predetermined magnitude from a first set of readings to a second set of readings over a predetermined period of time.

9. The apparatus of claim 1 wherein the container means comprises an inner container means provided to hold a cryogenic liquid as the liquid and an insulation means enclosing the inner container means in a surrounding relationship to retard ambient heat conduction and radiation to the cryogenic liquid.

10. The apparatus of claim 9 wherein the insulation means comprises an outer container means enclosing the inner container means in the surrounding relationship with an insulation material provided in an intermediate space formed between the inner and outer container means.

11. A device to be worn by a user to signal lack of motion of the device for a predetermined period of time comprising: a container having liquid therein, means for sensing contact by the liquid with each of a plurality of zones into which the container is divided at each of a plurality of times over the predetermined period of time and for obtaining a set of values representative of percentage of contact of the liquid with each of the zones at each of the times, means for comparing the sets of values, and means for signalling when the sets of values are substantially the same.

12. A device according to claim 11 wherein the sensing means comprises a plurality of capacitors corresponding to the zones, wherein the liquid is flowable between plates of each capacitor to serve at least partially as a dielectric therefor and further comprising means for measuring the capacitance of each of the capacitors.

13. A device according to claim 11, wherein the container is elongate and cylindrical and axially divided over the length thereof into the zones.

14. A method for detecting at least one of a liquid quantity within a container means and the spatial orientation of the container means comprising:
   a) providing a plurality of capacitor means disposed inside the container means, wherein the container means comprises a closed curved side wall enclosing a volume and wherein the capacitor means comprises a conductive portion of the closed curved sidewall providing a first conductor and a plurality of second conductive band means electrically insulated from each other, wherein the second conductive band means are spaced from the first conductor to follow the contour of the conductive portion of the closed curved side wall to thereby divide the container means into capacitor zones delineated by the plurality of the second conductive band means;
   b) changing the capacitor means with a liquid held inside the container means serving as a dielectric to thereby provide a plurality of capacitance measurements related to the extent the second conductive band means are immersed in the liquid in the container means, independent of the spatial orientation of the container means;
   c) determining at least one of a quantity of the liquid and the spatial orientation of the container means by appropriate manipulation of the capacitance measurements with respect to reference capacitance values of various percent fill quantities of the liquid in the container means at various spatial orientations; and
   d) utilizing at least one of the determined quantity of the liquid in the container means and the determined spatial orientation of the container means.

15. The method of claim 14 wherein the container means comprises an inner container means provided to hold a cryogenic liquid as the liquid and an insulation means enclosing the inner container means in a surrounding relationship to retard ambient heat conduction and radiation to the cryogenic liquid.

16. The method of claim 14 including scaling the capacitance measurements such that they are directly related to the extent the second conductive band means are immersed in the liquid in the container means.

17. The method of claim 14 further including actuating an alarm means by the computer means when the capacitance measurements fail to deviate by a predetermined magnitude from a first set of readings to a second set of readings over a predetermined period of time.

18. The method of claim 14 including manipulating the capacitance measurements by comparing them to the reference capacitance values to thereby obtain a best fit between the capacitance measurements and the reference capacitance values at the various percent fill quantities and at the various spatial orientations.

19. The method of claim 14 further including providing the container means having a cylindrical shape along and about a longitudinal axis with the second conductive band means aligned coaxially along and about the longitudinal axis.

20. The method of claim 19 further including actuating an alarm means by a computer means when the plurality of capacitance measurements fail to deviate by a predetermined magnitude from a first set of readings to a second set of readings over a predetermined period of time.

21. A method for sensing lack of motion of a container for a predetermined period of time comprising the steps of:
   a) providing the container to contain a liquid;
   b) sensing contact by the liquid with each of a plurality of zones into which the container is divided at each of a plurality of times over the predetermined period of time thereby obtaining a set of values representative of percentage of contact of the liquid with each of the zones at each of the times;
   c) comparing the sets of values whereby to sense lack of motion of the container if the sets of values are substantially the same.

22. A method according to claim 21 further comprising the step of operating an alarm when the sets of values are substantially the same.

23. A method according to claim 21 wherein the step of sensing contact comprises providing a plurality of capacitors in the container corresponding to the zones wherein the liquid is capable of flowing freely between plates of each capacitor to serve at least partially as a dielectric therefor, and measuring the capacitance of each of said capacitors.

24. A method according to claim 21 further comprising the step of selecting the container to be an elongate cylindrical container which is axially divided into the zones over the length thereof.

25. An apparatus for detecting at least one of a liquid quantity within a container means and a spatial orientation of the container means, which comprises:
   a) capacitor means disposed inside the container means and comprising a first conductor means and a second conductor means, the first conductor means provided by a plurality of conductive band means aligned in a proximately spaced and equidistant relationship with respect to the second conductor means to provide the plurality of capacitor means dividing the container means into zones, the liquid therein servable as a dielectric for the capacitor means independent of the spatial orientation of the container means;
   b) current generator means for charging the plurality of capacitor means to provide a plurality of capacitance measurements directly related to the extent the plurality of band means are immersed in the dielectric liquid;
   c) computer means for determining at least one of the quantity of liquid within the container means and the spatial orientation of the container means by appropriate manipulation of the plurality of capacitance measurements with respect to reference capacitance values for known extents of the plurality of band means immersed in the dielectric liquid corresponding to various percent fill quantities of the liquid in the container means and various spatial orientations of the container means; and
   d) alarm means actuatable by the computer means when the plurality of capacitance measurements fail to deviate by a predetermined magnitude from a first set of readings to a second set of readings over a given period of time.

26. An apparatus for detecting at least one of a liquid quantity within a container means and a spatial orientation of the container means, which comprises:
   a) a plurality of individual capacitor means disposed inside the container means to provide zones into which the container means is divided by the plurality of capacitor means, the liquid therein servable as a dielectric for the capacitor means independent of the spatial orientation of the container means;
   b) current generator means provided to charge the plurality of capacitor means, wherein the plurality of individual capacitor means provide a plurality of capacitance measurements derived from each of the zones, each of the capacitance measurements being directly related to the extent to which each of the individual capacitor means are immersed in the dielectric liquid in the container means;
   c) computer means for determining at least one of the volume of liquid within the container means and the spatial orientation of the container means by appropriate manipulation of the capacitance measurements with respect to reference capacitance values for known extents of the plurality of capacitor means immersed in the dielectric liquid corresponding to various percent fill quantities of liquid within the container means at various spatial orientations; and
   d) alarm means actuatable by the computer means when the plurality of capacitance measurements fail to deviate by a predetermined magnitude from a first set of readings to a second set of readings over a predetermined period of time.

27. An apparatus for detecting at least one of a liquid quantity within a container means and an orientation of the container means, which comprises:
   a) a plurality of individual capacitor means disposed inside the container means to provide zones into which the container means is divided by the plurality of capacitor means, the liquid therein servable as a dielectric for the capacitor means independent of the spatial orientation of the container means;
   b) current generator means provided to charge the plurality of capacitor means, wherein with the liquid serving as the dielectric, the plurality of individual capacitor means provide a plurality of capacitance measurements derived from each of the zones into which the container means is divided, each of the capacitance measurements being directly related to the extent to which each of the individual capacitor means are immersed in the liquid in the container means; and
   c) computer means for determining at least one of the volume of liquid within the container means and the spatial orientation of the container means by appropriate manipulation of the capacitance measurements with respect to reference capacitance values derived from either the liquid in the container means or a reference fluid serving as a second dielectric for various known percent fill quantities of the liquid within the container means at various spatial orientation.

28. An apparatus for detecting at least one of a liquid quantity within a container means and a spatial orientation of the container means, which comprises:

a) a plurality of individual capacitor means disposed inside the container means to provide zones into which the container means is divided by the plurality of capacitor means, the liquid therein servable as a dielectric for the capacitor means independent of the spatial orientation of the container means;

b) current generator means provided to charge the plurality of capacitor means, wherein the plurality of individual capacitor means for provided a plurality of capacitance measurements derived from each of the zones, and wherein each of the capacitance measurements is directly related to the extent to which each of the individual capacitor means is immersed in the dielectric liquid in the container means;

c) thermometer means that provides a measurement of the temperature of the liquid within the container means; and d) computer means for determining a least one of the volume of liquid within the container means and the spatial orientation of the container means by appropriate manipulation of the temperature measurement and by manipulation of the plurality of capacitance measurement in comparison to the reference capacitance values for various percent fill quantities of liquid within the container means at various spatial orientations.

29. A method for detecting at least one of a liquid quantity within a container means and a spatial orientation of the container means, comprising:

a) providing a detector means disposed inside the container means to divide the container means into zones provided by the detector means, wherein the detector means are contactable by a liquid held inside the container means to thereby provide a contact reading of the liquid with the zones independent of the spatial orientation of the container means;

b) determining at least one of the quantity of the liquid inside the container means and the spatial orientation of the container means by appropriate manipulation of the contact reading of the liquid with the zones and with respect to reference detection values of various percent fill quantities of the liquid in the container means at various spatial orientations; and c) actuating an alarm means by the computer means when the contact reading of the liquid with the zones provided by the detector means fails to deviate by a predetermined magnitude from a first set of readings to a second set of readings over a given period of time.

30. A method for detecting at least one of a liquid quantity within a container means and a spatial orientation of the container means, which comprises:

a) providing a capacitor means disposed inside the container means, the liquid therein serving as a dielectric for the capacitor means independent of the spatial orientation of the container means;

b) electrically charging the capacitor means using a current generator means applying an electrical charge to a first conductor means and to a second conductor means, the first conductor means comprising a plurality of conductive band means aligned in a proximately spaced and equidistant relationship with respect to the second conductor means to thereby provide a plurality of capacitor means dividing the container means into zones, wherein the capacitor means provides a plurality of capacitance measurements directly related to the extent the plurality of band means are immersed in the dielectric liquid independent of the spatial orientation of the container means;

c) manipulating the plurality of capacitance measurements with respect to reference capacitance values for various percent fill quantities of the dielectric liquid in the container means and at various spatial orientations of the container means to thereby determine at least one of the quantity of liquid within the container means and the spatial orientation of the container means; and d) actuating an alarm means by a computer means when the plurality of capacitance measurements fail to deviate by a predetermined magnitude from a first set of readings to a second set of readings over a given period of time.

31. An apparatus for detecting movement of a container means independent of the spatial orientation of the container means, which comprises:

a) capacitor means disposed inside the container means and comprising a first conductor means and a second conductor means, the first conductor means provided by a plurality of conductive band means aligned in a proximately spaced and equidistant relationship with respect to the second conductor means to provide the plurality of capacitor means dividing the container means into zones, the liquid therein servable as a dielectric for the capacitor means independent of the spatial orientation of the container means;

b) current generator means for charging the plurality of capacitor means to provide a plurality of capacitance measurements directly related to the extent the plurality of band means are immersed in the dielectric liquid;

c) computer means for manipulation of the plurality of capacitance measurements; and d) alarm means that is actuatable by the computer means when the plurality of capacitance measurements fail to deviate by a predetermined magnitude from a first set of readings to a second set of readings over a given period of time.

32. An apparatus for detecting movement of a container means, which comprises:

a) a plurality of individual capacitor means disposed inside the container means to provide zones into which the container means is divided by the plurality of capacitor means, the liquid therein servable as a dielectric for the capacitor means independent of the spatial orientation of the container means;

b) current generator means provided to charge the plurality of capacitor means, wherein the plurality of individual capacitor means provide a plurality of capacitance measurements derived from each of the zones, each of the capacitance measurements being directly related to the extent to which each of the individual capacitor means are immersed in the dielectric liquid in the container means;

c) computer means for manipulation of the plurality of capacitance measurements; and d) alarm means that is actuatable by the computer means when the plurality of capacitance measurements fail to deviate by a predetermined magnitude from a first set of readings to a second set of readings over a given period of time.

33. A method for detecting movement of a container means comprising:
   a) providing a detector means disposed inside the container means to divide the container means into zones provided by the detector means, wherein the detector means are contactable by a dielectric liquid held inside the container means to thereby provide a contact reading of the liquid with the zones independent of the spatial orientation of the container means;
   b) electrically charging the detector means using a current generator means, wherein the detector means provides at least two contact readings directly related to the extent the detector means are immersed in the dielectric liquid independent of the spatial orientation of the container means; and
   c) actuating an alarm means by a computer means when the plurality of contact readings fail to deviate by a predetermined magnitude from a first set of readings to a second set of readings over a given period of time.

34. A method for detecting movement of a container means, which comprises:
   a) providing a capacitor means disposed inside the container means, the liquid therein serving as a dielectric for the capacitor means independent of the spatial orientation of the container means;
   b) electrically charging the capacitor means using a current generator means applying an electrical charge to a first conductor means and to a second conductor means, the first conductor means comprising a plurality of conductive band means aligned in a proximately spaced and parallel relationship with respect to the second conductor means to thereby provide a plurality of capacitor means dividing the container means into zones, wherein the capacitor means provides a plurality of capacitance measurements directly related to the extent the plurality of band means are immersed in the dielectric liquid independent of the spatial orientation of the container means; and
   c) actuating an alarm means by a computer means when the plurality of capacitance measurements fail to deviate by a predetermined magnitude from a first set of readings to a second set of readings over a given period of time.

\* \* \* \* \*

UNITED STATES PATENT AND TRADEMARK OFFICE
CERTIFICATE OF CORRECTION

PATENT NO. : 5,790,422
DATED : August 4, 1998
INVENTOR(S) : Wendy Power, et al.

It is certified that error appears in the above-indentified patent and that said Letters Patent is hereby corrected as shown below:

Column 17, line 17 - delete "for provided" and insert
-- provide--.

Column 17, Lines 30 and 31 - delete "measurement" and insert
--measurements--.

Signed and Sealed this

Twenty-fourth Day of November,1998

Attest:

BRUCE LEHMAN

*Attesting Officer*   *Commissioner of Patents and Trademarks*